Patented Sept. 27, 1927.

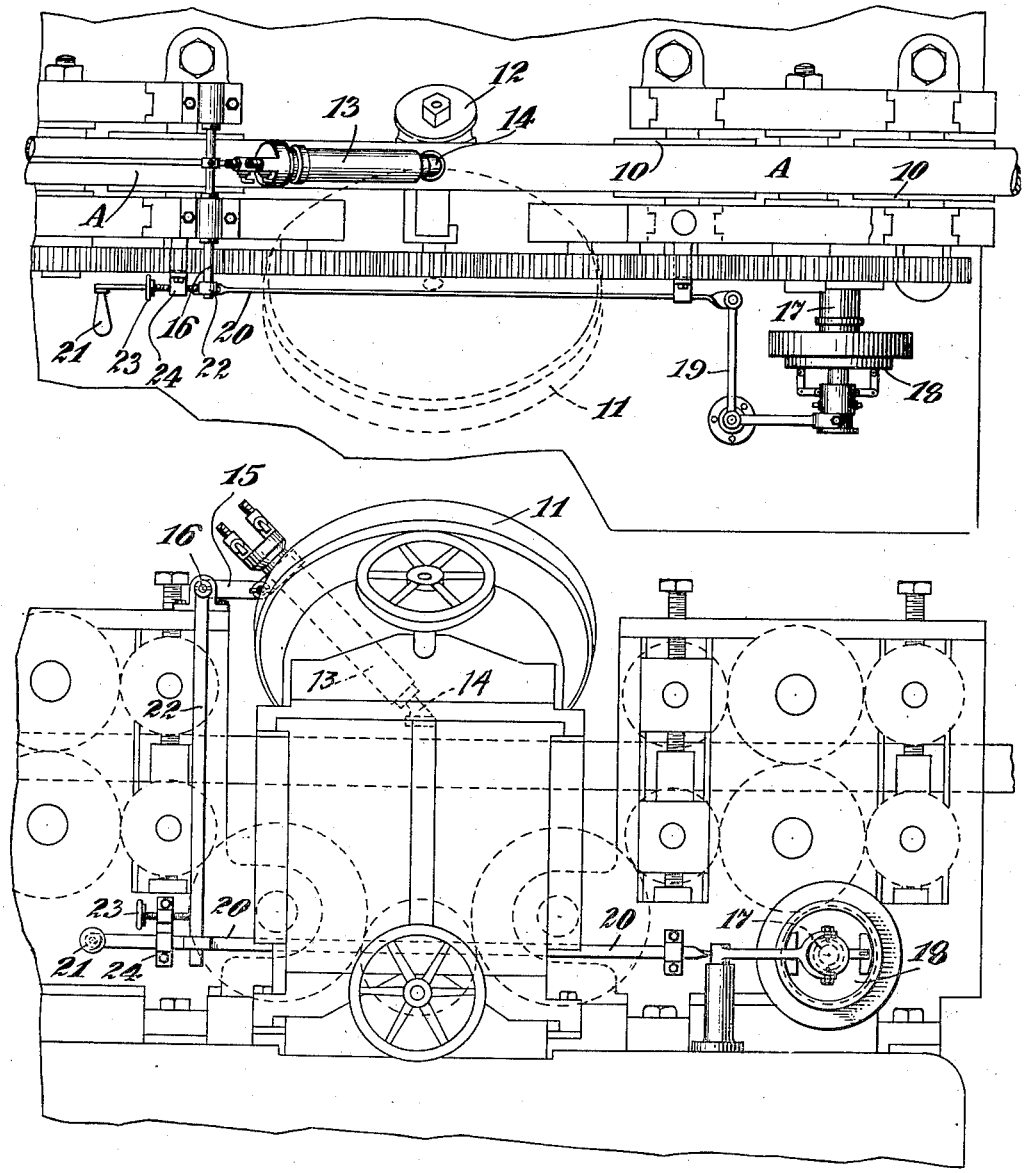

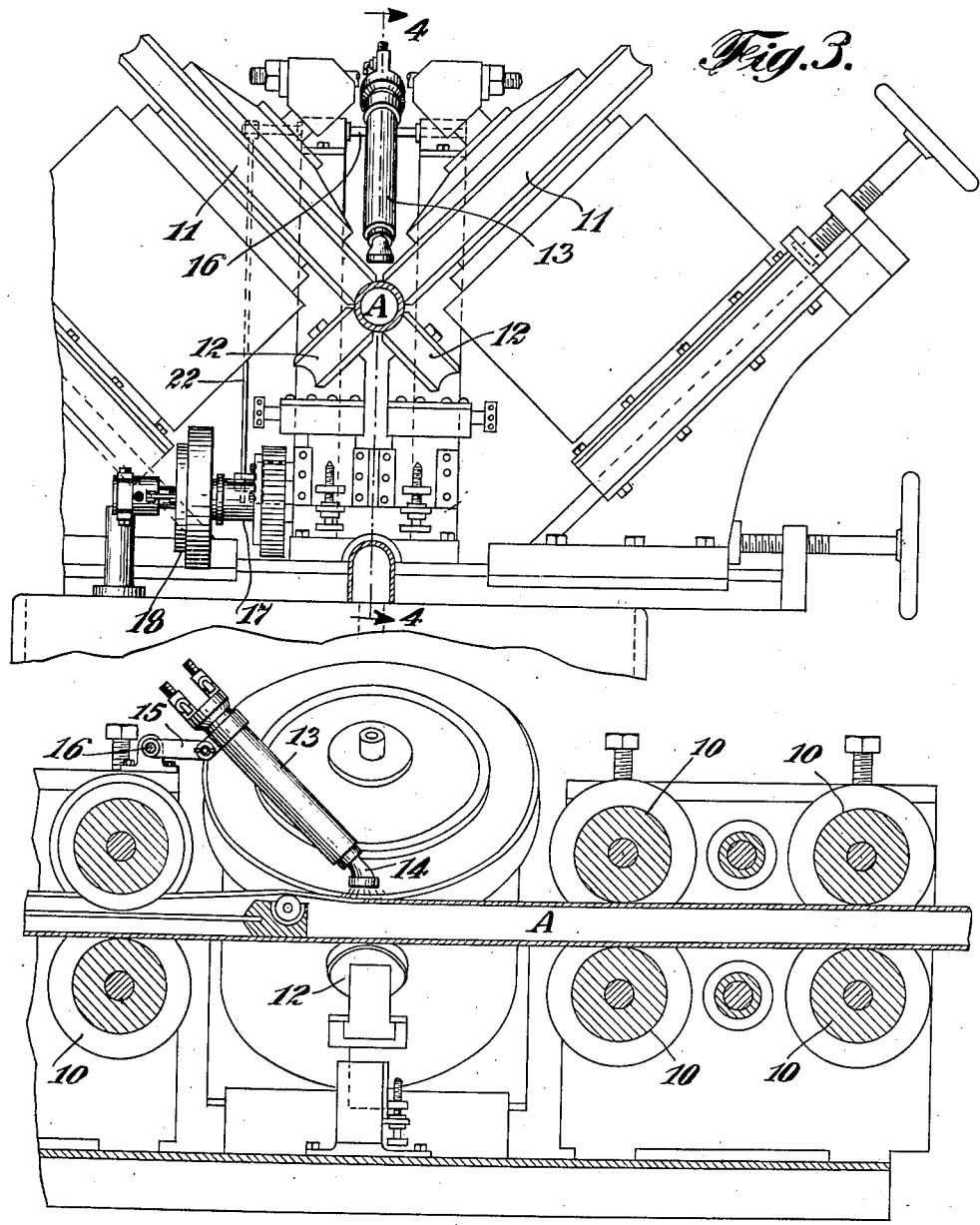

1,643,307

UNITED STATES PATENT OFFICE.

JOHN F. LAWSON, OF BROOKLYN, NEW YORK.

METHOD AND APPARATUS FOR WELDING.

Application filed May 16, 1924. Serial No. 713,690.

This invention is an improvement in the electric welding art, and is particularly adapted for welding together two metal parts which are continuously fed through the apparatus with the edges in abutting relationship so as to form a continuous seam, as for instance in the forming of metal tubes.

One of the main objects of my invention is to secure a thoroughly welded seam with the burr or bead flowed so smoothly that no later deburring is necessary.

With my improved apparatus I secure a continuous seam as distinguished from a seam made up of a series of welded spots with intervening unwelded spaces, which is produced by the use of the ordinary electric seam welder.

A further object of my invention is to very greatly increase the speed with which the material may be fed and the properly welded seam formed.

In carrying out my invention I employ auxiliary means to heat the specific spot where the electric current passes to effect the welding action. For this purpose I employ preferably an oxy-acetylene torch of the multiple jet type, and so position the torch as to deliver the flame on to the seam at a point directly between the electrodes.

A further object is to prevent the gas flame from puncturing the material or otherwise injuring it in case the feed of the material be stopped.

In the accompanying drawings I have illustrated my invention as applied to a type of construction described and claimed in my prior copending application Serial No. 529,031, filed January 13, 1922. It will of course be understood that my invention is not limited to this specific form of apparatus as it may be applied to any type of electric seam welder in which the electrodes are so positioned as to permit the torch to be located therebetween and the flame delivered directly onto the spot through which the current is passing.

In the accompanying drawings:

Fig. 1 is a side elevation of an apparatus embodying my invention.

Fig. 2 is a top plan view, certain of the parts being removed.

Fig. 3 is an end view, and

Fig. 4 is a longitudinal section on the line 4—4 of Fig. 3.

I have illustrated my invention as applied to a tube welding apparatus in which the tube A is advanced by a plurality of feed rollers 10, some of which act upon the completed tube and some act on the sheet before it is delivered to the welding apparatus. The electrodes are illustrated as rotary disks 11 operating in rolling contact with the tube and in planes substantially at 90° to each other. Opposite to each disk electrode is a supporting roller 12. The tube in passing through between these two disk electrodes and two supporting rollers is pressed so as to force together the two edges of the metal to form the seam and an electric current of high amperage and low voltage is passed from one electrode to the other and across the seam, to weld together the abutting edges of the metal.

In my improved construction I employ an oxy-acetylene welding torch 13 which may be of any suitable make and provided with a tip 14 adapted for the delivery of a row of substantially parallel jets or flames. As one essential feature of my invention the electrodes are so positioned in respect to each other that there is sufficient space between them for the tip of the torch, and the torch is so positioned that the flame plays directly onto the spot which is being welded by the electric current.

The torch is supported by means of a bracket or arm 15 which may be rigidly clamped to the torch, and this bracket is mounted on a rock shaft 16 so that by oscillating this shaft the tip 14 of the torch may be raised or lowered.

There is preferably provided means whereby when the machine is stopped the torch is automatically raised to such an extent that the material is no longer subjected to the direct action of the flame. This may be accomplished in various ways. For instance the main drive shaft 17 of the train of feed rollers may be provided with a stopping and starting clutch 18 which may be operated through a bell crank lever 19 and a pull rod 20 having a handle 21 at the feed end of the machine. The clutch is illustrated as also adapted to serve as a driving pulley. Thus, the outer part of the clutch may be considered as the source of power for the machine. This pull rod for controlling the stopping and the starting of the machine may be connected to the rock shaft 16 for oscillating the latter. As shown, the rock shaft 16 has a depending operating lever 22 which extends through a slot in the pull rod 20. The slot provides for limited lost motion whereby the torch may be adjusted to the proper distance from the weld, for instance, by means of an adjusting screw 23, mounted in a bracket 24 which supports the pull rod. The weight of the torch will tend to swing the rock shaft and operating lever 22 in one direction and hold them against the adjusting screw. Thus, by rotating this screw the torch may be raised or lowered. The parts are shown in operating position which they occupy when the machine is running. To stop the machine the operator pushes a handle 21 to disengage the clutch 18, and at the same time the lower end of the lever 22 will be moved toward the right from the position shown in Fig. 1, and the torch tip will be raised to sufficient distance above the tube so that the further heating effect of the torch on the tube is negligible so far as any burning or melting action is concerned. Thus it is not necessary to turn off the gas the instant the machine is stopped.

I am aware that it has been proposed to weld the seam of a tube by utilizing both the electric current and the torch flame, but so far as I know this has always involved placing the torch so that it plays upon the seam at a point spaced some distance back from the point across which the electric current flows. In other words, it has always been proposed that the torch act upon the seam after the latter has been electrically welded or has been subjected to the action of the electric current.

By applying the flame directly to the spot being welded by the electric current, certain important advantages are secured. If the tube be fed through the apparatus at any speed in excess of twenty feet per minute, the seam is not continuously welded but is welded at spots only. Between these spots are unwelded spaces corresponding to the high peak of the sine wave of the alternating current which is used for welding. This unwelded space is caused by the metal being blown out of the seam, and obviously no ordinary pressure will be sufficient to bring these parts in contact and make the metal surfaces unite. By placing a gas torch directly over the welding zone I am able to avoid these unwelded spaces and at the same time let the tube travel at a very much more rapid rate of speed. A torch operating in the rear of the welding zone does not accomplish this result. The electrodes are seldom set more than one-quarter of an inch apart, and the tube is heated to a white heat over only about one-sixteenth of an inch on each side of the seam. By the time the tube travels for any appreciable distance beyond the point at which the electric welding occurs, the comparatively cold tube has absorbed the heat from the seam until the latter has become a dull red and the gas torch has little or no effect on the seam at this temperature if the tube be traveling faster than ten feet per minute on No. 20 gauge steel. With my improved arrangement the flame plays directly onto the metal at the spot and at the time when the metal is heated to a white heat, and acts directly on the spaces between the spots welded by the electric current, and flows the metal to smooth down the burr or bead and to cause the filling up of the minute spaces from which the metal has been blown out, so that there is a continuous and uniform welded seam without the usual welded spots and unwelded gaps or spaces. As the torch acts on metal which is already at a white heat, it does not require any large consumption of gas to accomplish the portion of the welding which is done by means of the flame. The force of the flame almost instantly spreads out and smooths over the white-hot metal between the electrodes, and the tube may be fed endwise at a comparatively high rate of speed far in excess of anything possible where the torch acts in the rear of the welding zone.

As the torch is preferably of the multiple-jet type and the flame plays directly down onto the seam rather than along it, the flame heats a section of the seam of considerable length. The torch is preferably placed substantially as shown in Fig. 4, with about two-thirds of the tip face or flame jets in advance of the welding spot to preheat the metal, and about one-third in the rear of the welding spot to act on the white hot metal after the main body of the current ceases to pass through it, but before the metal has time to cool down from its white-hot condition.

In the construction illustrated I employ electrodes having rolling contact with the tube, and prefer to use this type, but so far as involves my broad invention, electrodes having sliding contact might be employed.

The current heats the metal to full welding temperature and therefore the flame need not be of such size as would be sufficient if used alone to heat the metal to this temperature. It merely acts on the metal already at the welding temperature and flows the white hot metal to form a continuous weld and smooth seam before the metal cools sufficiently to become rigid. Although the exact angle at which the flame jets impinge on the seam is not important, it is preferably approximately a right angle. The stopping of the action of the torch upon the stopping of the feeding means might involve a connection for automatically shutting off gas or for introducing a protecting baffle or imparting a movement other than a swinging one to the torch.

Instead of using the torch and gas flame, I may in some instances utilize electric heating means. For instance an electrode may be used in place of the torch, and an electric arc caused to pass from this electrode to the abutting edges of the tube at or slightly in advance of the point of the welding operation. This current may pass from the tube to any suitable roller contacting with the tube, and if desired insulated from the remainder of the machine. Instead of having an electrode, a roller may press on to the abutting edges in advance of the welding point and be connected in circuit through resistances to the two main contacting members 11. Such an electrode for an arc or such a roller may be very easily placed in position due to the construction and angular relationship of the disks 11.

Having thus described my invention, what I claim as new and desire to secure by Letters Patent is:

1. The method of welding metal articles together which consists in pressing together surfaces of said articles, passing a heating electric current across the contact line, and applying a flame directly to the portion of the contact line across which the current is passing.

2. The method of welding metal articles together, which consists in pressing together surfaces of said articles, passing a heating electric current across the contact line to heat the articles to welding temperature, and applying a flame directly to the portion of the contact line across which the current is passing to smooth down the burr while the metal is still at welding temperature.

3. The method of welding metal articles together, which consists in pressing together surfaces of said articles, passing a heating current across the contact line to heat the articles to welding temperature, and maintaining said temperature by an auxiliary heating means applied over a section of the contact line of greater length than that across which the main current passes, whereby a uniform and continuous weld is effected.

4. The method of welding metal articles together, which consists in pressing together surfaces of said articles, applying a flame to the contact line, and passing a heating electric current through a portion of the line which is being directly acted upon by said flame.

5. The method of welding tubes which includes progressively advancing the tube with the edges of the metal pressed together, passing an alternating electric current across the line of contact to heat the contacting portions to welding temperature, and smoothing out the seam and effecting a continuous and uniform weld by applying a flame directly to the portion of the seam across which the electric current is passed.

6. An apparatus for welding together metal articles including means for pressing together surfaces of said articles, electrodes disposed in contact with said articles adjacent to said edges, and means for directing a flame to said articles directly between said electrodes.

7. An apparatus for welding together metal articles, including means for pressing together surfaces of said articles, electrodes disposed in contact with said articles adjacent to said edges, means for directing a flame to said articles directly between said electrodes, and means for advancing said articles past said electrodes and said flame directing means.

8. An apparatus for welding together metal articles, including means for pressing together surfaces of said articles, electrodes disposed in contact with said articles adjacent to said edges, and a multiple jet blowpipe having its tip disposed between said electrodes for applying a flange directly to the portions of said articles through which the main electric current is passing.

9. An apparatus for welding together metal articles, including means for pressing together surfaces of said articles, electrodes disposed in contact with said articles adjacent to said edges, and a multiple jet blow-pipe having its tip disposed between said electrodes for applying a flame directly to the portions of said articles being heated by the electric current, the flame being delivered in a direction substantially at right angles to the seam.

10. An apparatus for wleding metal tubes which includes means for progressively advancing the tube to be welded, a pair of circular electrodes in rolling contact with the tube upon opposite sides of the seam to be welded, and a blow-pipe having its tip disposed between said electrodes and adapted to apply a flame to the portion of the tube directly between the points of contact of the electrodes with the tube.

11. An apparatus for welding metal tubes which includes means for progressively advancing the tube to be welded, a pair of circular electrodes in rolling contact with the tube upon opposite sides of the seam to be welded, a blow-pipe having its tip disposed between said electrodes and adapted to apply a flame to the portion of the tube directly between the points of contact of the electrodes with the tube, and means for automatically moving the blow-pipe away from the tube upon the stopping of the tube advancing means.

12. An apparatus for welding together metal articles, including a source of power, means driven thereby for advancing the article, a pair of electrodes engaging with said articles upon opposite sides of the seam to be welded, a blow-pipe for delivering a flame to the seam, and means for simultaneously disengaging said advancing means from said source of power and moving said blow-pipe out of operative relationship to said articles.

13. An apparatus for welding together metal articles, including means for advancing said articles with surfaces thereof pressed together, electrodes in contact with said articles for passing electric current across the contact line, a blow-pipe for heating the contact line, and means for simultaneously stopping the advancing of said articles and preventing further action of the flame on said articles.

14. An apparatus for welding together metal articles, including means for advancing said articles with surfaces thereof pressed together, electrodes in contact with said articles for passing electric current across the contact line, a blow-pipe for heating the contact line, said blow-pipe being pivoted to swing toward and from said line, a clutch for controlling the advancing of said articles, and means for simultaneously operating said clutch and swinging said blow-pipe.

15. An apparatus for welding together metal articles, including means for advancing the articles with surfaces in contact, a blow-pipe, means for pivotally supporting the blow-pipe, an operating arm connected to said blow-pipe, and means engaging with said arm to swing the blow-pipe to inoperative position upon the stopping of the advancing means.

16. An apparatus for welding metal tubes, including a source of power, feed rollers for advancing the tube, a clutch connecting said feed rollers and said source of power, a pair of electrodes contacting with the tube for passing an electric current across the seam to be welded, a blow-pipe for applying a flame to the seam to be welded, a pivotal support for said blow-pipe, an operating member for engaging and disengaging the clutch, and means connecting said operating member and said blow-pipe for moving the latter to inoperative position upon the disengaging with the clutch.

Signed at Brooklyn in the county of Kings and State of New York this 7th day or April, A. D. 1924.

JOHN F. LAWSON.